United States Patent
Gorski et al.

(10) Patent No.: US 7,353,178 B2
(45) Date of Patent: Apr. 1, 2008

(54) TOUCH POINT AND ATTRIBUTE TRACKING SYSTEM AND PROCESS

(75) Inventors: Mark C. Gorski, Carnation, WA (US); Kevin E. Hanley, Redmond, WA (US); Vicki A. Kruse, Bothell, WA (US); Jonathan R. Tuttle, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1246 days.

(21) Appl. No.: 10/137,173

(22) Filed: Apr. 30, 2002

(65) Prior Publication Data
US 2003/0204409 A1 Oct. 30, 2003

(51) Int. Cl.
*G06Q 10/00* (2006.01)

(52) U.S. Cl. .......................... 705/1; 705/28
(58) Field of Classification Search .............. 705/1, 705/28
See application file for complete search history.

(56) References Cited

U.S. PATENT DOCUMENTS

| | | | |
|---|---|---|---|
| 5,978,774 A | 11/1999 | Rogers et al. | 705/24 |
| 6,018,719 A | 1/2000 | Rogers et al. | 705/24 |
| 6,085,172 A | 7/2000 | Junger | 705/28 |
| 6,536,659 B1* | 3/2003 | Hauser et al. | 235/375 |
| 6,970,826 B2* | 11/2005 | Christensen et al. | 705/1 |
| 2004/0172260 A1* | 9/2004 | Junger et al. | 705/1 |
| 2005/0100144 A1* | 5/2005 | O'Connor | 379/88.22 |

FOREIGN PATENT DOCUMENTS

| WO | WO 01/88831 A2 | 11/2001 |
|---|---|---|
| WO | WO 01/17605 A1 | 2/2002 |
| WO | WO 02/31809 A1 | 4/2002 |

OTHER PUBLICATIONS

Junger et al. U.S. Appl. No. 60/203,933.*
O'Connor U.S. Appl. No. 60/238,452.*
Rachel Beck, "We Take That Back: Stores Tightening Their Return Policies", Dec. 31, 1996, Wisconsin State Journal, p. 8.B.*

* cited by examiner

*Primary Examiner*—Naresh Vig
(74) *Attorney, Agent, or Firm*—Woodcock Washburn LLP

(57) ABSTRACT

A manufacturer's product registration system includes a database system storing product registration information concerning a plurality of products, for example, consumer electronics products. The product registration information includes, for each unit, a unique identifier or serialization associated with that unit, the date on which that unit was shipped to a retailer, and, if the unit was sold to a consumer, the date on which the unit was sold to a consumer. In addition, the information stored in the database system (which could include one or more databases) includes return policy information concerning a pre-established return policy for each retailer. The product registration system also comprises an interactive voice response (IVR) system for permitting a retail clerk to telephonically enter a Serial Number to query the database system to determine the identity of a particular retailer that sold a particular unit, and to determine whether the particular unit is within a pre-established return period for the retailer that sold that unit. The system also includes a returns tool that provides a means by which a retailer can request a return merchandise authorization (RMA) for one or more units to be returned to the manufacturer. The returns tool is adapted to communicate over a network with the database system.

20 Claims, 3 Drawing Sheets

TOUCH POINT AND ATTRIBUTE TRACKING SYSTEM AND PROCESS

FIELD OF THE INVENTION

The present invention relates generally to a system and process for tracking products throughout their lifecycles. One illustrative implementation of the present invention involves a product tracking system maintained by a manufacturer to track video game consoles as they are distributed to retailers, sold to consumers, and possibly returned by consumers for credit or repair. This process leverages current data capture, database and data reporting tools to track the gaming consoles' movements and genealogy, and facilitates product returns, repairs, recalls, etc.

BACKGROUND OF THE INVENTION

Product manufacturers and retailers have used electronic registration systems to help ensure compliance with return policies and to reduce improper or fraudulent product returns under warranty. For example, manufacturers and retailers of consumer products often have standard return policies, such as a retail return policy that allows a consumer to return a purchased product for any reason within a certain number of days after purchase; and a manufacturer return policy that permits the return of defective products within a particular time period after purchase, and provides for repair of defective products within a different, typically longer time period. Such return policies are intended to ensure consumer satisfaction while protecting the manufacturer and/or retailer from improper returns.

The present invention is particularly suited for use in connection with the tracking of video game consoles and consumer electronics. This is due to the relatively high cost to manufacture the consoles along with the potentially large number of peripherals associated with a console return. Additionally, the gaming business has seen a higher propensity toward consumer fraud surrounding returns, which requires the console manufacturer and retailers to be cautious in granting credit for the return of a gaming console. Further background information concerning electronic registration systems of the type outlined above may be found in the following United States patents and prior art documents cited in these patents: U.S. Pat. No. 6,085,172, Jul. 4, 2000, titled "Method and Apparatus for Efficient Handling of Product Return Transactions"; and U.S. Pat. No. 5,978,774, Nov. 2, 1999, titled "Electronic Registration System for Product Transactions".

As described in greater detail below, the present invention takes advantage of technologies in the areas of data storage, data capture and data reporting, to enable the tracking of a unique identifier or serialization of a product for the entire life cycle of the object, i.e., from cradle to grave. (The term "serialization" refers to a Serial Number that uniquely identifies a specific instance of a product, as opposed to a type of product. In this sense, a Serial Number is distinguished from a Universal Product Code, or UPC, which identifies a type of product.) Such a process of tracking a unique serialization can be used for security, validation, recall, returns, etc. As the object travels through its life, Touch Points (sometimes called TPs) can be established to capture the unique serialization and report the same to a data storage component. Each Touch Point can have attributes (such as Serial Number and date) that are unique or similar to attributes of other Touch Points, as long as they are linked to the uniquely serialized object. Although electronic registration systems have been known, heretofore manufacturers have not had a system to track a product through its entire life cycle, i.e., its beginning, its configuration, its modification and its eventual end, and then leverage Touch Points to determine information such as when a console may be returned by retailers. (The term Touch Point refers to a point in the lifecycle of a unit where the Serial Number and/or other attributes of the unit may be collected for storage in one or more databases. Exemplary TPs are described below.)

SUMMARY OF THE INVENTION

The present invention provides an expanded and improved system and process for tracking products over their life cycles. When implemented using a database system maintained by the manufacturer and made accessible to retailers through electronic communications, including an interactive voice response (WVR) system and an Internet-based returns tool, the invention can be employed to track products on a worldwide basis. For example, a system in accordance with the present invention uses a unique Serial Number that uniquely identifies the product (or any physical thing) in conjunction with bar code scanning (or other data capture mechanism) and database technologies to enable the manufacturer, in cooperation with the retailers, to keep track of when a particular game console was shipped to a retailer and when that retailer sold the particular console to a consumer. In addition to the Serial Number and date information (TP attributes), the database system preferably includes information concerning business rules associated with the different retailers selling the game consoles. Such business rules then leverage the TP attributes and can be used to derive items such as the period in which the console may be returned to the manufacturer for credit and the period in which the console may be returned to the manufacturer for repair under a pre-established warranty. Then, if the consumer attempts to return the console to the particular retailer, or even to a different retailer, the retailer confronted by the consumer may use the IVR system to inquire as to the identity of the retailer that sold the console and whether that retailer may return the console to the manufacturer for credit. This provides a simple and efficient mechanism intended to encourage retail clerks to check, before accepting a console from a consumer, to make sure that this console was purchased from this retailer (as opposed to another retailer) and that the manufacturer will accept it back and credit the retailer's account. This system in turn benefits both the manufacturer and the retailer(s) since it tends to reduce the number of improper returns and thereby reduces the overall cost of selling the consoles.

Another aspect of the inventive system is an Internet/Web-based console returns tool. This tool is designed for use by retailers to easily and efficiently request a return merchandise authorization, or RMA, for one or more consoles. The console returns tool communicates electronically to query the database system discussed above to make sure that the particular console sought to be returned is within the previously agreed upon return period.

Additional aspects of the inventive system are a reporting system that can identify the last Touch Point and the specific product's genealogy (i.e., details such as how, where and when it was manufactured), which can be used for manufacturer recalls. The tracking and reporting of Touch Points can also be used for assessment of what units were sold and when, for special reward programs. This inventive system can also be used to validate the identity of a product and its uniqueness from other products and units of its product family.

Other features of the present invention are described below.

BRIEF DESCRIPTION OF THE DRAWINGS

The following detailed description of preferred embodiments will be better understood when read with reference to the appended drawings. For the purpose of illustrating the invention, there is shown in the drawings exemplary constructions of the invention, although the invention is not limited to the specific implementation details described below and depicted in the drawings. In the drawings.

DETAILED DESCRIPTION OF PREFERRED EMBODIMENTS

We will now describe in detail one implementation of the present invention. This implementation, or embodiment, was designed for use in connection with the tracking of video game consoles, and the following description relates to this exemplary embodiment. However, except to the extent that they are expressly so limited, the claims at the end of this specification are by no means intended to be limited to applications of the present invention to the field of game consoles.

Overview

The presently preferred implementation of the invention provides a system and process for tracking a product through its life cycle, e.g., from a distribution turnkey vendor ("DTV") through return. This capability is important for purposes of product return, recall processing, repair period definition, and warranty processing. For example, in accordance with the present invention, when a video game console is shipped to a retailer or distributor, the Serial Number, seller (DTV), retailer/distributor sold to, and date information (i.e., date of product transfer to the retailer/distributor) are captured electronically at the DTV and stored in a database within a serial and shipment tracking (SST) system. The SST system therefore captures TPs and their attributes, and so it may also be referred to as a Touch Point and Attribute Tracking system. Moreover, in accordance with the invention, when the retailer sells the console to a consumer, the Serial Number, retailer, and date information (i.e., date of sale to a consumer) is captured and transmitted electronically to the SST database system. After the information for a particular console is stored in the SST database system, a retail clerk can use an interactive voice response (IVR) system to determine whether the manufacturer will accept the unit for return from the retailer. For example, the retail clerk will telephonically contact the IVR system and provide the Serial Number of the returned console. In response, the IVR system provides the store clerk with the name of the retailer that sold the console (where the retailer name is an attribute captured in the sales transaction TP) and a verbal Yes/No response indicating whether or not the particular console is within the period in which the manufacturer will accept the unit for return from the retailer.

In further accordance with the illustrative embodiment of the invention, retailers having consoles to return to the manufacturer may request a return merchandise authorization (RMA) by entering the Serial Number for each console on a manufacturer returns tool web page. The manufacturer's TP and attribute tracking system is able to derive an identification of the retailer and the manufacturer's product code (i.e., the SKU, or stock keeping unit, number) and to determine the expiration of the return period based on the information in the SST database.

Touch Points and Attributes

Figure 1:
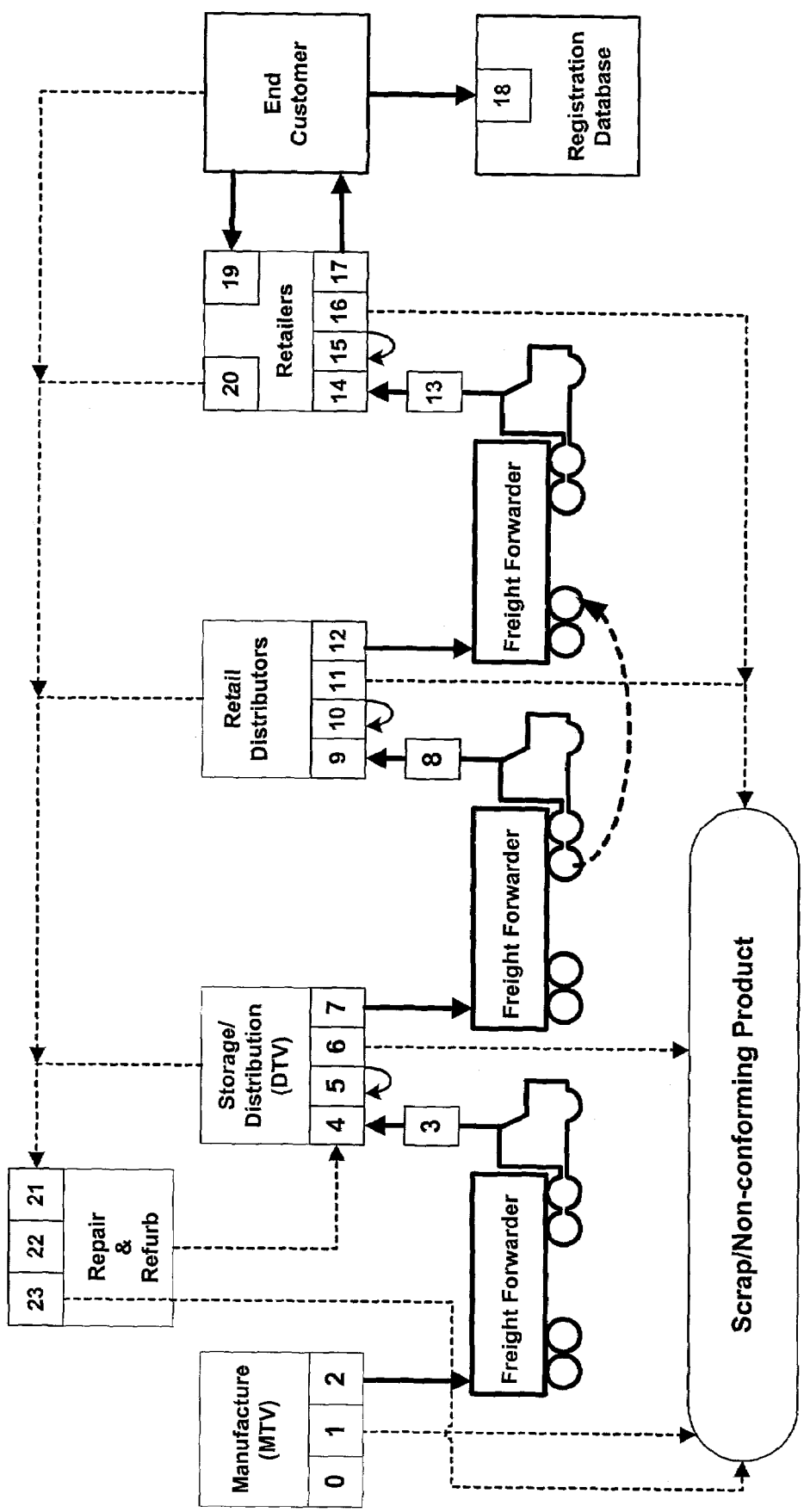
FIG. 1 illustrates some of the possible Touch Points of a product as it goes through its life cycle.

FIG. 1 schematically illustrates possible Touch Points of a product during its lifecycle. The TPs are numbered 1-23 and are distributed among an MTV, DTV, Retail Distributor, Retailers, Registration Database, and Repair/Refurbish facility, as shown. Of course, the present invention is by no means limited to a system having all of these facilities, nor does the invention require that all of these TPs be utilized.

The TPs and attributes in this example are shown in the table below. At each TP, the Serial Number and/or other attributes of a console may be collected for storage in one or more databases. The invention is not limited to a particular data collection mechanism, but conventional bar code scanners are exemplary devices for this purpose. Moreover, in the example of FIG. 1, the Repair and Refurbishment facilities are grouped in one box although they perform different functions. The Repair facility focuses on the repair of end user consoles, provides for retailers who return customer consoles for repair, links Call Center systems to Service Center systems, and provides repair status and reporting to the Call Centers. In contrast, the Refurbishment facility focuses on the refurbishment of retailer returned consoles, and provides for the conversion of "A" channel product to "B" channel product. These concepts are well known in the field of product manufacturing and will not be discussed in detail herein.

| TOUCH POINTS | ATTRIBUTES |
|---|---|
| 0 - Manufacturing Complete | Detailed list of components used to manufacture the consumer device along with the components' serial numbers/lot numbers |
| 1 - Goods Issue to Scrap/Non-conforming Product | Reason for scrapping |
| 2 - MTV Outbound Shipment | Shipment information, containment information (unit placed in a master pack and/or pallet) |
| 3 - POD (Proof of Delivery) from Freight Forwarder | Shipping details (who shipped to and how) |
| 4 - DTV Inbound Receipt | Received from, how received |
| 5 - DTV Pallet breakdown and Re-pack | New containment information |
| 6 - Goods Issue to Scrap/Non-conforming Product | Reason for scrapping results of scrapping |
| 7 - DTV Outbound Shipment | Shipping information, containment information (unit placed in a master pack and/or pallet) |
| 8 - POD from Freight Forwarder | Similar to above |
| 9 - Goods Receipt at Retail Distributor | Similar to above |
| 10 - Pallet breakdown and Re-pack | Similar to above |

-continued

| TOUCH POINTS | ATTRIBUTES |
| --- | --- |
| 11 - Goods Issue to Scrap/Non-conforming Product | Similar to above |
| 12 - Retail Distributor Outbound Shipment | Similar to above |
| 13 - POD from Freight Forwarder | Similar to above |
| 14 - Goods Receipt at Retailer | Similar to above |
| 15 - Retailer Stock Movement (Store-to-Store Transfer) | Location movement of new and old stocking locations |
| 16 - Goods Issue to Scrap/Non-conforming Product | Similar to above |
| 17 - Retailer POS (Point of Sale) to Customer | Similar to above |
| 18a - Registration Card received from Customer | When and where purchased, personal information |
| 18b - Extended Warranty purchased by Customer | Similar to above |
| 19 - Returns Receipt to Retailer | Purpose for return, condition of return |
| 20 - Retailer Outbound Shipment to Repair/Refurb | Similar to above |
| 21 - SCV (Service Center Vendor) Inbound Receipt | Similar to above |
| 22 - SCV Outbound to B-Channel Retailer | Similar to above |
| 23 - Goods Issue to Scrap/Non-conforming Product | Similar to above |

Serial and Shipment Tracking System

Figure 2:
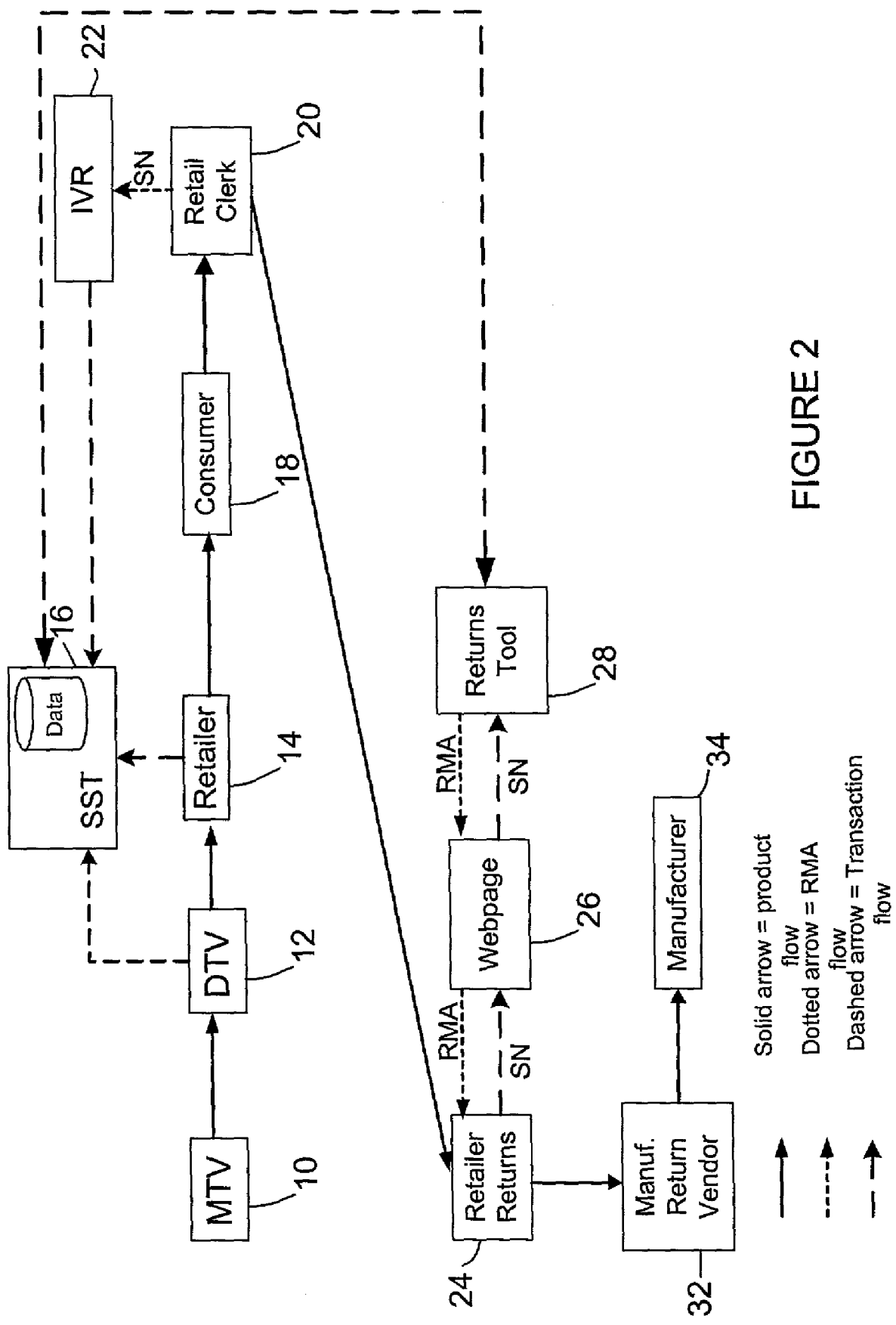
FIG. 2 is a flow diagram illustrating a presently preferred implementation of a product tracking system that leverages Touch Points and tracks attributes in accordance with one aspect of use of the present invention.

The present inventors have implemented a game console SST system, schematically depicted in FIG. 2, in which SST data is collected from DTVs and from retailers, as described below. As shown, the process begins with the shipment of game consoles from the MTV 10 to a DTV 12. The consoles are then shipped from the DTV to the Retailer(s) 14 and/or distributors (not shown), and then sold by the retailers to consumers 18. The SST database system 16 is responsible for tracking console Serial Number (SN) and shipment status worldwide. The Serial Number (SN), seller (DTV), sold 10 to (retailer/distributor), and date information (i.e., the date that the console is transferred to the retailer) is captured at the DTV 12 when the consoles are shipped to the retailer or retail distributors. This information is captured electronically and stored in a database within the SST 16, as shown.

In addition, as shown, the SN, Sold to (retailer), and date information (i.e., the date the console is sold to a consumer) are captured from the Retailer 14 when a console is sold to a consumer 18. This information is transmitted electronically to the SST database system 16, e.g., in the form of an EDI-140 transaction, and stored in a database within the SST. (Electronic Data Interchange, or EDI (in the US; each country may have its own transmission standard), is a standard for computer-to-computer transfer of information in a structured, pre-determined format. EDI-140 refers to a particular format of data interchange.).

After the information for a particular console is stored in the SST database system 16, a retail clerk 20 can use the Interactive Voice Response (IVR) system 22 to determine whether the manufacturer will accept the console for return from the retailer 14. A clerk typically will make such a determination when a consumer returns a console to the retailer, particularly when the consumer is unable to produce a sales receipt.

The clerk will telephonically contact the IVR system 22 and provide the Serial Number of the returned console. In response, the IVR system 22 will provide the retail clerk 20 with the name of the retailer that sold the console and a "YES/NO" response indicating that the console is within the period in which the manufacturer 34 will accept the console for return from the retailer 14. Note that the return period may vary from retailer to retailer and the IVR system 22 will provide the "YES/NO" response to the clerk based on the retailer that sold the console regardless of where the consumer 18 is attempting to return the console. For example, if a consumer 18 attempts to return to "Retailer A" a console that was purchased at "Retailer B," the IVR system 22 will respond as if the consumer has attempted to return the system to Retailer B. The retailer 14 ultimately determines whether the console is accepted from the consumer 18. Hence, if a "Retailer A" store clerk accepts a console sold at "Retailer B," the manufacturer 34 will later accept the console from "Retailer A" based on that retailer's return period as determined by the SST database system 16 even though "Retailer B's" return period was quoted on the IVR system 22.

After the retailer accepts a console for return, the console is typically sent to a retailer return center 24 for return to the manufacturer 34, e.g., via a return vendor 32. The retail return center 24 typically returns the consoles in batch to the manufacturer. Before the retailer return center returns the consoles to the manufacturer, a return merchandise authorization (RMA) is requested for the particular batch of consoles to be returned. The RMA is requested by entering the Serial Number for each console on a returns tool web page 26 and submitting the Serial Numbers using the returns tool web page to a console returns system or tool 28, which forms a part of the overall SST system. Each console Serial Number is evaluated individually for return. Those that meet the retailer return contract are included in the batch RMA noted above. The console returns tool 28 is able to derive an identification of the retailer and the Product Code (i.e., the SKU number) and to determine the expiration of the return period based on the information in the SST database 16. Preferably, the expiration of the return period is based on the date the console was sold to the consumer. If the particular console is within the prescribed return period, which may have first been indicated by the IVR system 22, an RMA is provided to the retailer, and the retailer is then able to include the RMA with the return shipment to the manufacturer 34. Note that the retailer is not necessarily required to use the IVR system—it could instead employ only the returns system 26, 28 instead.

In the preferred embodiment, the retailer 14 does not include the console's UPC nor does it include a specific retailer/store code when it requests an RMA. Both the UPC and retailer information are derived from the information in the SST database. Retailer information is derived from SST database for the return period, but validation of what particular retail store is making the request is derived from the Returns Tool log-in.

Console Serial Number

Figure 3:
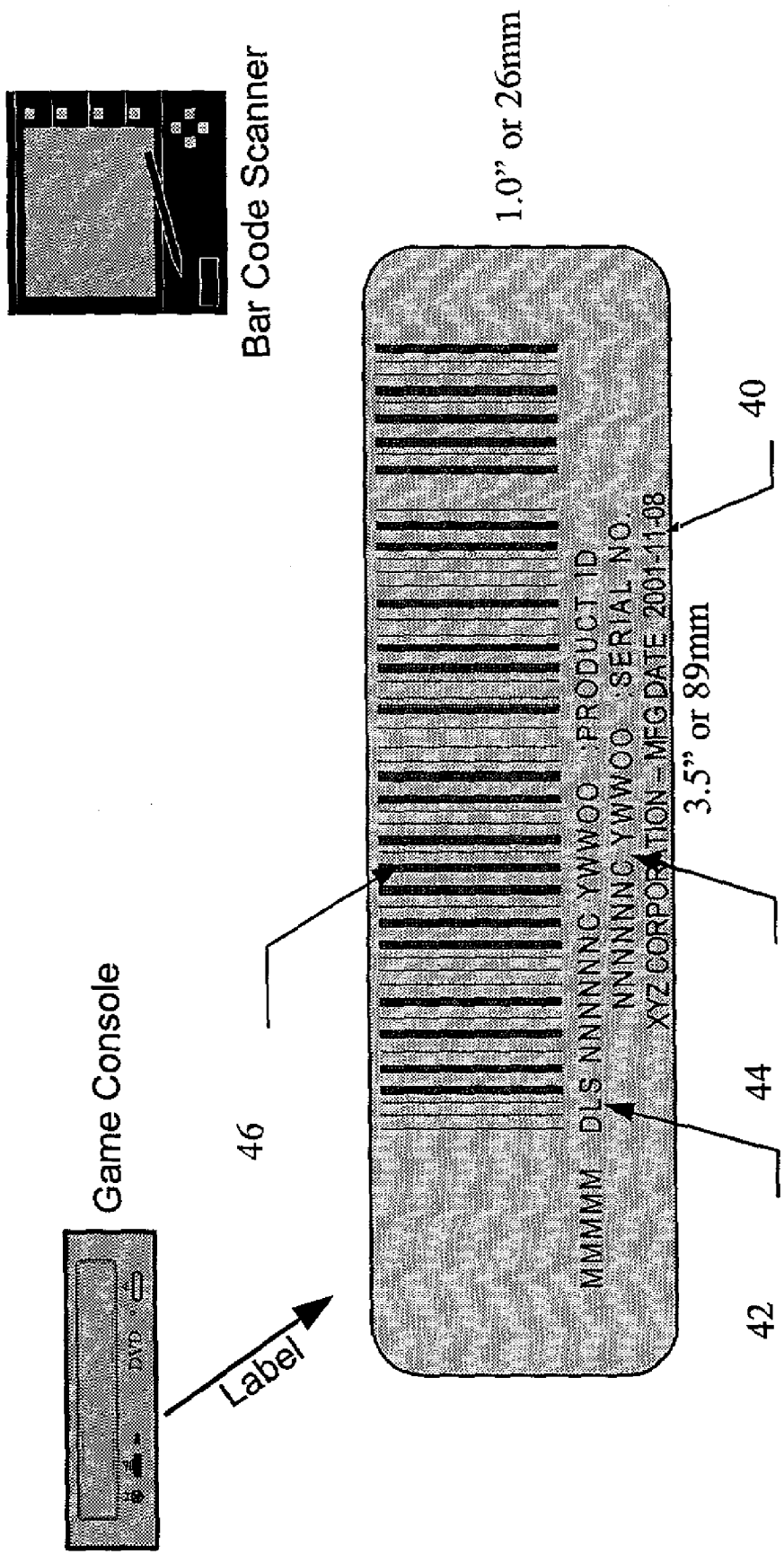
FIG. 3 is an illustration of an exemplary embodiment of a Serial Number bar code label that shows one example of a unique serialization to uniquely identify a product and a specific unit of that product in accordance with the present invention.

The following is an overview of a presently preferred format for the Console Serial Number label in this example. FIG. 3 provides an illustration of such a label and includes representations of a game console and a bar code scanner.

There are different requirements for Serial Number information within the different business groups of the console manufacturer. Therefore, the SN specification requires that each label contain two numbers, a Product ID number and a Serial Number. In this example, the Serial Number is a unique bar-coded 12-digit subset of the Product ID number. The primary audience for the Product ID is the group responsible for design and manufacture, a group that has no requirement for barcode scanning. The primary audiences for the SN are the retailers and distributors who require a barcode and human readable text with specific limitations.

As shown in FIG. 3, the bottom-most part of the label contains the name of the manufacturer and the date of manufacture in the format: "XYZ Corporation—Mfg Date"+YYYY-MM-DD, as indicated with reference numeral 40. Moreover, as indicated with reference numeral 42, the Product ID appears just below the bar code 46 for the SN. The format of the Product ID is:

MMMMM DLS NNNNNNC YWWOO+":PRODUCT ID".

In the above format, Digits 1-5 (MMMMM) are the Manufacturer's SKU number; Digit 6(D) represents the Day of the week product was manufactured; Digit 7(L) represents the production line that manufactured the console; Digit 8(S) represents the Shift on which the product was manufactured; Digits 9-14 (NNNNNN) represent the sequence of manufacturing of the product for that shift production; Digit 15(C) is a Check Digit; Digit 16(Y) represents the year in which the product was manufactured; Digits 17-18(WW) represent the Work Week of production; and Digits 19-20(OO) represent the Country code.

Reference numeral 44 refers to the format of the Serial Number. In this example, the exemplary format is "NNNNNNCYWWOO". This number is human readable and exactly matches the last twelve (12) digits of the Console Product ID number (ref. numeral 42). It should be noted that, since the SN is composed of digits that include only the manufacturing sequence number (NNNNNN), Check Digit (C), Year digit (Y), Week digits (WW) and Country code (OO), the SN does not identify the product type (i.e., game console as distinguished from some other product), and the Serial Number is thereby distinguished from what is commonly known as a UPC (Universal Product Code).

Finally, the Serial Number Barcode 46 represents the 12-digit SN.

CONCLUSION

While the present invention has been described in connection with presently preferred embodiments, it is to be understood that other embodiments may be used and that modifications and additions may be made to the described embodiments for performing the same functions of the present invention without deviating therefrom. For example, the present invention is by no means limited to electronic product registration systems that require a particular bar code Serial Number format, nor does the invention require the retailer(s) to employ an IVR system to check the product registration database, before accepting a return from a consumer, to determine whether the manufacturer will accept the particular console and credit the retailer's account. The Serial Number is a unique identifier or serialization of a unit that uniquely allows it to be tracked from other units of its kind or completely different units. Moreover, the present invention does not require the retailer(s) to utilize a web page and returns tool to request an RMA before shipping a returned console to the manufacturer. Furthermore, it should be emphasized that a variety of computer platforms, database management systems, and electronic communications and networking protocols and devices may be employed in practicing the invention. Accordingly, the scope of protection of the following claims is in no way limited to the particular embodiments described above.

We claim:

1. A manufacturer's product registration system, comprising:
    a database system storing Touch Point (TP) and attribute information concerning a plurality of individual units, said TP and attribute information including identifiers for the plurality of individuals units, each identifier associated with a date identifying with a the individual unit was shipped to a specific retailer, a return policy of the specific retailer, and a date identifying when the individual unit was sold to a consumer;
    means for receiving queries to the database system to track a particular unit through its life cycle, wherein said database utilizes said (TP) and attribute information for processing said queries;
    means for identifying a particular retailer out of the plurality of retailers that sold the particular unit based on the (TP) and attribute information;
    means for determining the return policy of the retailer that sold the particular unit; and
    means for authorizing the return of the particular unit, wherein the authorization is based on the return policy of the retailer that sold the particular unit regardless of the return policy of a retailer that the particular unit is being returned to.

2. A system as recited in claim 1, wherein the TP and attribute information further includes information concerning a pre-established return policy for each retailer.

3. A system as recited in claim 2, wherein the system is configured to identify a particular retailer that sold the particular unit to a consumer.

4. A system as recited in claim 3, wherein the system is configured to determine whether the particular unit is within a pre-established return period in which the particular retailer may return the particular unit to the manufacturer for credit.

5. A system as recited in claim 4, wherein the pre-established return period is the period in which the manufacturer, by agreement with the retailer that sold the unit, will accept the unit from that retailer and credit an account associated with that retailer.

6. A system as recited in claim 1 and further comprising a returns tool that provides a means by which a retailer can request a return merchandise authorization (RMA) for one or more units to be returned to the manufacturer, wherein the returns tool includes means for communication over a network with the database system.

7. A system as recited in claim 6, wherein the returns tool is Internet-based in that it includes means for communicating with the retailer and the database system over the Internet.

8. A system as recited in claim 1, wherein the individual units comprise video game consoles.

9. A system as recited in claim 1, wherein the means for receiving queries to the database system includes receiving queries to the database system from an interactive voice response (IVR) system.

10. A system as recited in claim 9, wherein, when the IVR system is configured to query the database system, using only a Serial Number (SN) associated with the particular unit and the system is configured to respond verbally.

11. A system as recited in claim 1, wherein the information stored in the database further includes a Serial Number (SN) associated with each of the individual units.

12. A system as recited in claim 1, wherein the TP and attribute information further includes information concerning a pre-established return policy for each retailer; wherein the system is configured to identify a particular retailer that sold the particular unit to a consumer; wherein the system is configured to determine whether the particular unit is within a pre-established return period in which the particular retailer may return the particular unit to the manufacturer for credit; and wherein the individual units comprise video game consoles.

13. A system as recited in claim 12, wherein the pre-established return period is the period in which the manufacturer, by agreement with the retailer that sold the unit, will accept the unit from that retailer and credit an account associated with that retailer; wherein the means for receiving queries to the database system includes receiving queries to the database system from an interactive voice response (IVR) system; wherein, when the IVR system is configured to query the database system, using only a Serial Number (SN) associated with the particular unit and the system is configured to respond verbally; and wherein the information stored in the database further includes a Serial Number (SN) associated with each of the individual units.

14. A system as recited in claim 13, and further comprising a returns tool that provides a means by which a retailer can request a return merchandise authorization (RMA) for one or more units to be returned to the manufacturer, wherein the returns tool includes means for communication over a network with the database system; and wherein the returns tool is Internet-based in that it includes means for communicating with the retailer and the database system over the Internet.

15. A manufacturer's product registration system, comprising:
 a database system storing product registration information concerning a plurality of video game consoles and return policy information for a plurality of retailers that sell the videogame consoles, said product registration information including, for each console, a Serial Number (SN) associated with that console, the date on which that console was shipped to a retailer, an identity of the retailer, and, if the console was sold to a consumer, the date on which the console was sold to the consumer, and said return policy information concerning a pre-established return policy for each retailer;
 IVR means for permitting a retail clerk to telephonically enter a Serial Number to query the database system to track a particular videogame console through its life cycle, wherein said database utilizes said (TP) and attribute information for processing and queries, wherein the query invokes one or more procedures operable to determine the identify of the retailer that sold the sold the videogame console, and access the return policy for the retailer; and
 a returns tool that provides a means by which a retailer can request a return merchandise authorization (RMA) for the videogame console to be returned to the manufacturer, wherein the returns tool includes means for communication over a network with the database system, and the return merchandise authorization is based on the return policy of the retailer that sold the console regardless of the return policy of the retailer that the console is being returned to.

16. A system as recited in claim 15, wherein the returns tool is Internet-based in that it includes means for communicating with the retailer and the database system over the Internet.

17. A system as recited in claim 15, wherein the pre-established return period is the period in which the manufacturer, by agreement with the retailer that sold the unit, will accept the unit from that retailer and credit an account associated with that retailer.

18. A system as recited in claim 15, wherein, when the IVR system is configured to query the database system, using only a Serial Number (SN) associated with the particular unit and the system is configured to respond verbally.

19. A system as recited in claim 15, wherein the returns tool is Internet-based in that it includes means for communicating with the retailer and the database system over the Internet; wherein the pre-established return period is the period in which the manufacturer, by agreement with the retailer that sold the unit, will accept the unit from that retailer and credit an account associated with that retailer; and wherein, when the retail clerk uses the IVR system to query the database system, the IVR system is configured to query the database system, using only a Serial Number (SN) associated with the particular unit and the system is configured to respond verbally.

20. A system as recited in claim 15, wherein the database system stores Touch Point (TP) and attribute information, said TP and attribute information including dates on which the individual consoles were shipped to a retailer and dates on which at least some of the individual consoles were sold to a consumer.

* * * * *

UNITED STATES PATENT AND TRADEMARK OFFICE
CERTIFICATE OF CORRECTION

Page 1 of 1

PATENT NO. : 7,353,178 B2
APPLICATION NO. : 10/137173
DATED : April 1, 2008
INVENTOR(S) : Mark C. Gorski et al.

It is certified that error appears in the above-identified patent and that said Letters Patent is hereby corrected as shown below:

In column 8, line 8, in Claim 1, after "with a" delete "the".

In column 10, line 2, in Claim 15, delete "identify" and insert -- identity --, therefor.

In column 10, line 3, in Claim 15, after "sold the" delete "sold the".

Signed and Sealed this
Twenty-second Day of February, 2011

David J. Kappos
*Director of the United States Patent and Trademark Office*